US008843477B1

(12) United States Patent
Tirumalareddy et al.

(10) Patent No.: US 8,843,477 B1
(45) Date of Patent: Sep. 23, 2014

(54) ONSITE AND OFFSITE SEARCH RANKING RESULTS

(75) Inventors: Sundeep Tirumalareddy, Milpitas, CA (US); Trystan G. Upstill, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 198 days.

(21) Appl. No.: 13/285,995

(22) Filed: Oct. 31, 2011

(51) Int. Cl.
*G06F 17/30* (2006.01)
*G06F 15/16* (2006.01)

(52) U.S. Cl.
CPC .................... *G06F 17/30* (2013.01); *G06F 15/16* (2013.01)
USPC ........... 707/723; 707/706; 707/748; 707/758; 707/766; 709/203; 709/206; 715/205; 715/234

(58) Field of Classification Search
CPC .......... G06F 17/30; G06F 15/16; G06Q 30/00
USPC ......... 707/705–712, 723, 728, 748–751, 758, 707/766; 709/203, 206, 215–220; 705/26.8, 705/26.7, 27.2; 715/205, 234
See application file for complete search history.

(56) References Cited

U.S. PATENT DOCUMENTS

| | | | |
|---|---|---|---|
| 6,795,820 B2 * | 9/2004 | Barnett ............................... | 1/1 |
| 7,028,026 B1 * | 4/2006 | Yang et al. ........................ | 1/1 |
| 7,192,706 B2 * | 3/2007 | Hafen et al. .................. | 435/6.14 |
| 7,792,706 B2 | 9/2010 | Tirumalareddy et al. | |
| 8,200,694 B1 | 6/2012 | Diligenti et al. | |
| 8,326,826 B1 * | 12/2012 | Upstill et al. .................. | 707/723 |
| 2002/0073197 A1 * | 6/2002 | Bhogal et al. .................. | 709/224 |
| 2004/0039734 A1 * | 2/2004 | Judd et al. ......................... | 707/3 |
| 2005/0165753 A1 * | 7/2005 | Chen et al. ........................ | 707/3 |
| 2005/0240580 A1 * | 10/2005 | Zamir et al. ...................... | 707/4 |
| 2006/0224587 A1 * | 10/2006 | Zamir et al. ...................... | 707/7 |
| 2007/0038608 A1 * | 2/2007 | Chen ................................. | 707/3 |
| 2007/0038620 A1 * | 2/2007 | Ka et al. ............................ | 707/5 |
| 2007/0276807 A1 * | 11/2007 | Chen et al. ........................ | 707/3 |

(Continued)

FOREIGN PATENT DOCUMENTS

WO WO 2005/029368 * 3/2005
WO WO 2010/118167 * 10/2010

OTHER PUBLICATIONS

Aravid Chandramouli et al. "A popularity based URL ordering Algorithm for Crawls", IEEE 2010, pp. 556-562.*

(Continued)

*Primary Examiner* — Srirama Channavajjala
(74) *Attorney, Agent, or Firm* — Fish & Richardson P.C.

(57) ABSTRACT

Methods, systems, and apparatus, including computer programs encoded on a computer storage medium, for ranking search results. One method includes ranking web objects in response to a search query to generate a global ranking based on a relevance of each web object to the search query and a relative authority of each web object compared to other web objects in the plurality of web objects, each web object including a web page in a corresponding website that includes a plurality of web pages; ranking the plurality of web pages corresponding to each website based on onsite ranking criteria to generate an onsite ranking; generating a combined ranking for each web page based on a combination of the global ranking of the web object that includes the web page and the onsite ranking of the web page; and presenting web pages responsive to the search query based on the combined rankings.

18 Claims, 3 Drawing Sheets

(56) References Cited

U.S. PATENT DOCUMENTS

| | | | |
|---|---|---|---|
| 2008/0140643 A1* | 6/2008 | Ismalon | 707/5 |
| 2008/0222062 A1* | 9/2008 | Liu et al. | 706/15 |
| 2008/0243838 A1* | 10/2008 | Scott et al. | 707/5 |
| 2008/0270377 A1* | 10/2008 | Liu et al. | 707/5 |
| 2009/0043665 A1* | 2/2009 | Tirumalareddy et al. | 705/26 |
| 2009/0119261 A1* | 5/2009 | Ismalon | 707/3 |
| 2009/0299978 A1* | 12/2009 | Farfurnik et al. | 707/3 |
| 2010/0223268 A1* | 9/2010 | Papakonstantinou et al. | 707/749 |
| 2011/0225137 A1* | 9/2011 | Patel et al. | 707/706 |

OTHER PUBLICATIONS

Ja-Hwung Su, et al., "Effective Ranking and Recommendation on Web Page Retrieval by Integrating Association Mining and PageRank", 2008 IEEE/WIC/ACM International Conference on Web Intelligence and Intelligent Agent Technology, pp. 455-458.*

* cited by examiner

ONSITE AND OFFSITE SEARCH RANKING RESULTS

TECHNICAL FIELD

The subject matter described in this specification relates to ranking search results.

BACKGROUND

Online search engines generally rank web objects to present search results that are responsive to a search query. Search results for a query may be displayed in a particular order based on the ranking of the web objects. Search engines may rank the web objects based on various factors. For example, search engines may rank web pages based on information obtained from sources external to the web pages that reflect an inferred quality of the web page and on information about the content of the web pages that reflect the relevance of the web page with respect to a search query.

SUMMARY

In accordance with the systems and processes described in this specification, a search query is received. A plurality of web objects is ranked in response to the search query to generate a global ranking, wherein the ranking is based at least in part on a relevance of each web object to the search query and a relative authority of each web object compared to other web objects in the plurality of web objects, with each web object including at least one web page included within a corresponding website that includes a plurality of web pages. The plurality of web pages corresponding to each website is ranked based on a set of onsite ranking criteria to generate an onsite ranking A combined ranking is generated for each web page based on a combination of the global ranking of the web object that includes the web page and the onsite ranking of the web page. A list of web pages responsive to the search query is presented based on the combined rankings.

Possible implementations can optionally include one or more of the following features. Each web object corresponds to a web page and the global ranking includes a ranking of web pages from a plurality of websites. Each web object corresponds to a website and the global ranking includes a ranking of a plurality of websites. Generating the combined ranking includes modifying the global ranking for at least one web page based on the onsite ranking for the at least one web page. Generating the combined ranking for each web page includes limiting a degree of modification of the global ranking based on at least one of an internal structure of the corresponding website or a threshold level of relative authority of the web page compared to other web pages in the plurality of web pages.

The importance of each web page is evaluated, wherein evaluating the importance of each web page includes identifying an internal structure of the corresponding website and determining a relative placement of the web page within the internal structure. Generating the combined ranking for at least one web page includes modifying the global ranking for the corresponding website based on the onsite ranking for the at least one web page. The importance of each web page is evaluated based on at least one of a relevance of the web page to the search query relative to other web pages within the corresponding website or an analysis of links to the web page from other web pages within the corresponding website. Ranking the plurality of web objects includes generating a global ranking score for each web object, ranking the plurality of web pages includes generating an onsite ranking score for one or more web pages within the corresponding website, and generating the combined ranking for each web page includes combining the global ranking score for the web object that includes the web page and the onsite ranking score for the web page. The set of onsite ranking criteria is used to determine an importance of each web page relative to other web pages included within the corresponding website. The set of onsite ranking criteria is used to determine an importance of a particular resource within the corresponding website based on at least one of a type of the search query, a type of the corresponding website, a relative age of the particular resource with respect to other resources associated with the corresponding website, or a type of content associated with the particular resource. The set of onsite ranking criteria used to rank the plurality of web pages is different than a set of criteria used to generate the global ranking for the plurality of web objects.

In a second general aspect, a computer program product is tangibly embodied in a computer-readable storage medium and includes instructions that, when executed, receives a search query. A global ranking score is computed for web objects responsive to the search query, wherein each web object includes at least one web page included within a corresponding website that includes a plurality of web pages. Onsite ranking scores are computed for web pages of a particular website in the responsive web objects, wherein computing the onsite ranking score includes evaluating an importance of the at least one web page relative to other web pages within the particular website. A representative web page is determined for the particular website based on the onsite ranking scores for the particular website. The global ranking score for the particular website is adjusted based on the onsite ranking score for the representative web page.

Implementations can include any or all of the following features. The global ranking score for a particular website is computed based on data identified without reading information from the particular website. Evaluating an importance of a particular webpage includes identifying an internal structure of a website associated with the particular webpage and determining a relative placement of the particular webpage within the internal structure. The global ranking score for a particular website is based, at least in part, on a level of trust in a domain associated with the particular website.

Particular embodiments of the subject matter described in this specification can be implemented so as to realize one or more of the following advantages. In some implementations, the relevance of search results returned from a search engine may be increased by incorporating certain local signals into the ranking of search results. The local signals may include information that is relevant within a particular website but that may also provide additional information for ranking the website relative to other websites in a set of search results. Further, in view of the possibility of reading inaccurate or unreliable data when gathering local signals, an appropriate balance may be achieved by examining the structure of a website or the relative authority of the website when using local signals to rank search results.

The details of one or more embodiments of the invention are set forth in the accompanying drawings and the description below. Other features of the invention will be apparent from the description and drawings, and from the claims.

BRIEF DESCRIPTION OF THE DRAWINGS

Like reference numbers and designations in the various drawings indicate like elements.

DETAILED DESCRIPTION

This specification generally describes technologies relating to ranking web objects in search engine results. Search engines may generate a list of ranked search results for a given query. The ranked search results may include web objects, which may include websites, web pages, or other data objects (e.g., images, media files). The web objects may be arranged in an order based on a relevance of a web object to the given query, a relative authority of a website associated with a web object compared to other websites in the list of ranked search results, and/or other factors. For example, the first search result listed in response to the particular query may be associated with the highest scores based on relevance with respect to a particular query and on reliability of the website associated with the search result relative to other potential search results. Search results having sequentially lower combined scores may follow in sequence in the rankings. The ranking of specific web objects against other web objects in the list of search results may be referred to as a global ranking of web objects. In some instances, a search engine determines a global ranking of web objects by determining a global ranking score for each web object, which may be based, to a significant degree, on offsite data associated with the web object. The offsite data may include signals identified without reading information from the web object, including, for example, a number of links to a web page or website from other unrelated websites, the number of times users have selected the web page or website in search results responsive to a particular query, or other statistical data providing information regarding the relevance or authority of a particular website associated with the web object. Onsite data may also be used along with offsite data in computing the global ranking score for a web page in the search results. Onsite data may include data based on information directly obtained from the web page or website, such as the number of keywords on the web page or website responsive to the search query, the location of the responsive keywords, a number of links to the web page from other web pages having the same domain, and/or the placement of the web page in the structure of the website. In some instances, a website may include a collection of related web pages. For instance, a website may include web pages associated with a common domain. Further, as used in the present disclosure, a signal may include any data used in the ranking of potential search results in response to a received query.

For each website represented in the list of search results, the search engine may further rank the web pages associated with the same website based on the importance of each web page relative to other web pages of the same website to produce an onsite ranking of the web pages within a website. In some implementations, an onsite ranking score is calculated for each web page associated with a website to determine the local ranking of web pages within the same website. The onsite ranking score may be determined based on onsite data, or information directly obtained from the web page or website, such as the number of keywords responsive to the search query on a particular web page, the location of the responsive keywords on the web page, a number of links to the web page from other web pages having the same domain, and/or the placement of the web page in the structure of the website. The search engine may then combine the onsite ranking score with the global ranking score into a combined ranking score for ranking search results. In some cases, the combined ranking score of a web object may be based primarily on the global ranking score but adjusted based on the onsite ranking scores for individual web pages associated with the same website. Although the present disclosure describes the use of ranking scores (e.g., global ranking scores, combined ranking scores, or onsite ranking scores) when ranking web objects in search results, the web objects may be ranked without the use of actual score values. For example, a ranking of a set of web objects may be based on the arrangement of the web objects in a particular order without assigning specific values to the scores for the web objects. The global ranking of web objects may include ranking of websites, individual web pages, or a combination of both, in the search results. Within a particular website, however, there may be individual web pages that are ranked with respect to other web pages within the same website using an onsite ranking score associated with web pages of the website. Accordingly, the global ranking score may generally be applied to web objects, which may include global ranking of specific web pages or websites. Onsite ranking scores, however, generally apply to individual web pages within the same website.

In certain implementations, different weights may be assigned to different components of the global ranking score or to the onsite ranking score. For example, the global ranking score may be based on both offsite data and onsite data, but more weight may be given to offsite data when calculating the global ranking score. Similarly, the onsite ranking score may be based on both onsite data and offsite data but with more weight given to the onsite data.

Figure 1:
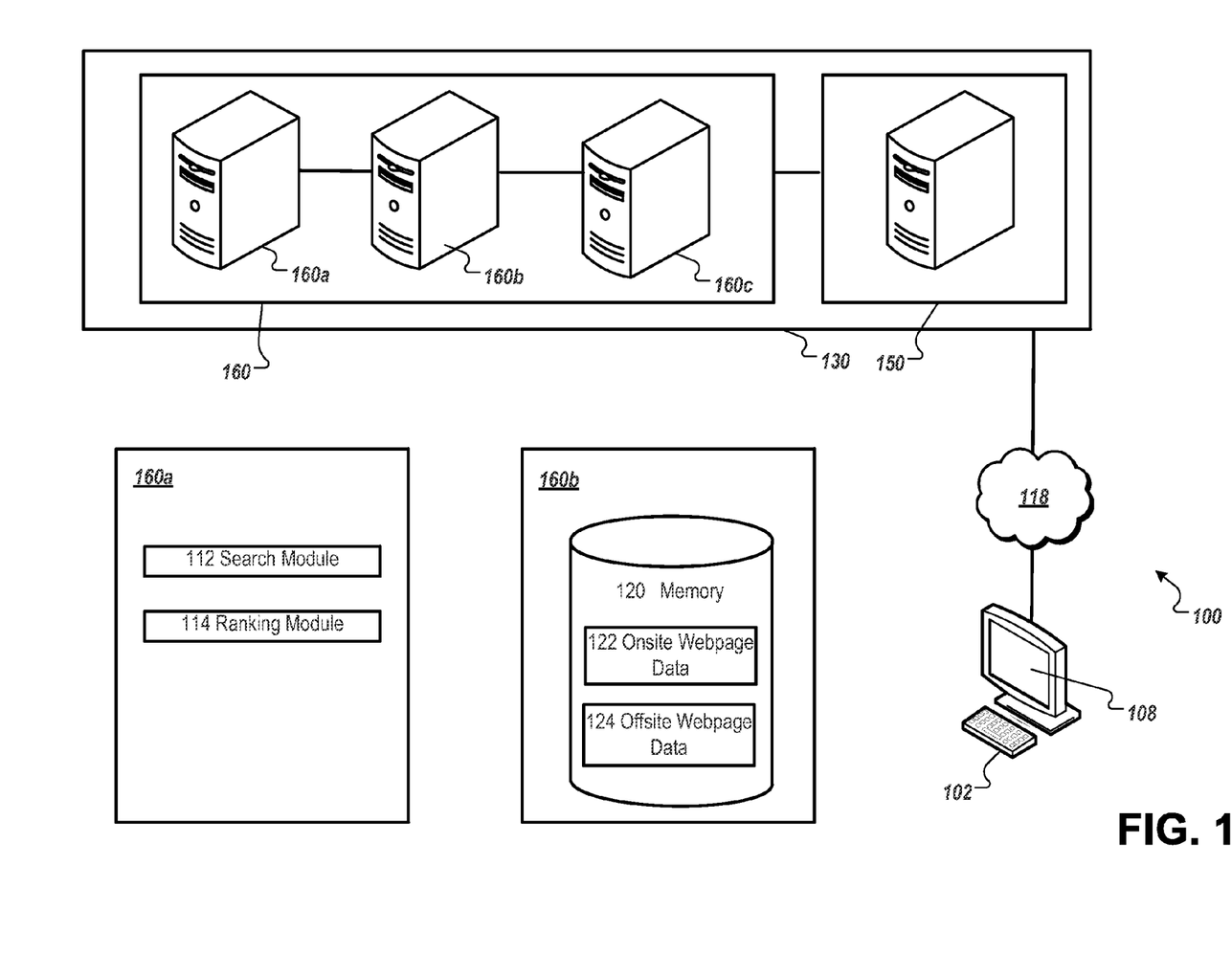
FIG. 1 is a block diagram of an example environment for ranking web objects in search results.

FIG. 1 is a block diagram illustrating an example architecture for a system 100 that ranks search engine results. The system 100 includes a computer 102 that may be used by a user interacting directly with the computer 102 through a display screen 108. In some instances, the computer 102 can be a personal computer, server, laptop, mobile device, PDA, tablet, or other computing device. The computer 102 may execute programs, perform data manipulations, and control tasks in the computer 102. The programs may include a web browser or other application configured to present a graphical user interface (GUI) to a user for accessing web pages and search services hosted by external computers, such as server 150, that receive requests from the computer 102.

As illustrated in FIG. 1, server 150 may be part of a server system 130 that includes one or more front-end servers 150, which may receive requests from the computer 102 or other client devices. In some cases, a search can be carried out on one of the front-end servers 150, although a search may typically be performed using back-end servers 160a, 160b, or 160c, in a search engine system 130, which may be distributed across many servers in a server farm or distributed across numerous server farms. The search engine 160 may be implemented on one or more back-end servers, such as servers 160a, 160b, and 160c, and include any search system that generates a set of search results in response to a search request or query. In some implementations, the search request may be received by one of the front-end servers 150 and passed to one or more back-end servers 160 to perform various distributed tasks to generate a set of ranked search results. The ranked search results are then assembled onto a web page and sent back to the requesting client computer system 102 from the front-end server 150 or a different server.

Each of the servers 150, 160*a*, 160*b*, 160*c* may include an electronic computing device operable to receive, transmit, process, store, or manage data and information associated with the search engine system 130. The servers may each include a processor that can execute programs, perform data manipulations, and control tasks in the server. The servers may each include a memory, which can include volatile and/or non-volatile memory.

The system 100 can also include one or more peripheral devices, and one or more controllers and/or adapters for providing interface functions. The peripheral devices can include a display device 108, such as a monitor or touch-screen display, to provide a graphical user interface to a user of computer 102. Graphical elements associated with search engines 160 or other applications, such as images, video, or text associated with input fields, search results, input suggestions, or web pages can be presented to the user through display device 108. The display device 108 can also present an interface for receiving requests submitted by a user of computer 102.

The network 118 can be the Internet, a local area network (LAN), a wide area network (WAN), or any other network or combination thereof. A network 118 (e.g., the Internet, a local area network (LAN), a wide area network (WAN), or any other network or combination thereof) can connect the server 160*a* to one or more servers 150, or computer 102 may communicate via messages or requests over network 118.

In some implementations, one or more of the servers 160*a*, 160*b*, and/or 160*c* may include logic for implementing the search functionality required by the search engine system 130. In the illustrated example, server 160*a* may include a search module 112 configured to receive a search query and determine a set of ranked search results responsive to the search query. The server 160*a* may generate a list of responsive search results for presentation to a user or forward the search results to another server within the search engine system 130 for transmission to a user device 102. In some cases, the search module 112 may generate a web page or GUI with input fields for receiving user input for submitting search requests to a general search engine, map-specific application, or other query-based service hosted by the search engine system 130. The input fields may be defined in a web page or other document generated for display on a user device such as the computer 102. Although the search module 112 is illustrated as being hosted on a single server 160*a* in FIG. 1, the search module 112 may also be distributed across multiple servers 160*a*, 160*b*, or 160*c* in the search engine system 130.

As illustrated in FIG. 1, the memory 120 of one of the servers 160*b* in the search engine system 130 may be operable to store data associated with applications or search engines 160, such as search results or web page data 122 and 124. Although FIG. 1 illustrates a single server 160*b* having a memory 120 that stores web page data 122 and 124, the web page data 122 and 124 associated with the search engine system 130 may be distributed across a plurality of repositories and/or servers within the search engine system 130. The web page data may include "onsite data" 122 obtained directly from the web page or from other web pages sharing, originating from, or having the same domain as the web page. Onsite data 122 may generally include any information controlled or affected by a webmaster or developer of the web page that provides an indication of the content of the web page or the relative importance of information found on the web page. For example, a web page with multiple instances of the word "laptop" may indicate that the web page is relevant to the subject matter of laptop computers. The location of the word "laptop" may further confirm the content of the web page, such as if the word "laptop" appears in the header of the web page. Further, if numerous other web pages associated with the same domain contain links to that particular web page, the web page may be of greater importance within the domain compared to other web pages. Accordingly, onsite web page data 122 may represent the relevance or importance of a particular web page within a website or domain consistent with how the webmaster intended the web page to be perceived by other viewers. Examples of onsite web page data 122 may include the number of keywords responsive to the search query, the location of the responsive keywords, a number of links to the web page from other web pages having the same domain, or other signals from a webmaster or developer associated with the web page regarding the content of the web page. The onsite web page data 122 may also include the placement of a web page in relation to the overall structure of the website associated with the web page. For example, a web page designated as the homepage of the website may be regarded as a more important web page than another web page that requires navigation through several hyperlinks before it can be viewed.

The web page data may also include "offsite data" 124 obtained from reading signals outside the webmaster's control. Offsite data 124 may include information from external sources that provide an indication of the relevance, authority, popularity, or importance of a web page in general or with respect to certain subject matter or to a specific search query. In some cases, offsite data 124 may relate to the importance or authority of a website compared to other websites as well as to the importance of a particular web page on the website compared to web pages on other websites. For example, the fact that numerous other websites associated with other well-respected domains and that are known to be relevant to laptop computers contain numerous links to a particular website may be an indication that the particular website is a relatively important website regarding laptop computers.

At the same time, the number of links to the particular website from other websites may also indicate a higher authority associated with the particular website. The offsite data 124 associated with a website may include information reflecting the authority of the website. For example, a website with a high level of authority and that generally relates to laptop computers may be trusted to present web pages with reliable content relating to laptop computers. Further, the website may be trusted to place web pages in appropriate locations within the structure of the website in accordance with the relative importance of each web page. Accordingly, websites with high levels of authority may be trusted to provide onsite data 122 that accurately define the relevance of various web pages on the website.

In some instances, the authority of a website may be a value assigned to the website or to web pages associated with the website based on various factors that reflect the level of trust in the website for presenting reliable content or for presenting web page data consistent with the content of the website. The factors may include, for example, the number of external links to web pages on a website as well as the authority of external websites that have links to the website. For example, websites that are associated with a larger number of external links may be assigned a higher authority value than websites having fewer external links. Further, a website that is linked to by an external website with higher authority (e.g., a more reputable website) may be assigned a higher authority value than a website that is linked to by an external website with less authority. Generally, the larger the number of external links to a web page, the higher the authority of the website hosting the web page. In some instances, the relevance of the website to a search query regarding laptop computers may also be measured by a frequency that a particular search result has been selected in response to the search query. Examples of offsite data 124 for a website may include the number of links to the website from external sources, or other external statistical data associated with the website.

In some instances, the onsite data 122 and offsite data 124 may be automatically and periodically collected, updated, stored, or indexed within memory 120 at server 160*b* or at another location within the search engine system 130. Further, the onsite data 122 and offsite data 124 may be stored or distributed across multiple locations, such as at other servers within the search engine system 130.

The search module 112 may use the onsite data 122 and offsite data 124 to determine a set of search results in response to a search query received at the server 160*a*. In some implementations, a ranking module 114 at server 160*a* is configured to rank the search results based on the relevance of a particular search result with respect to the search query and the relative importance of the search result based on various factors. In certain implementations, the ranking module 114 determines a combined ranking score to assign to a particular web page in the search results based on a combination of onsite and offsite data associated with the web page. The ranking module 114 may, for example, calculate an initial global ranking score for web objects compared to other web objects in the search results. In some implementations, the global ranking score may include a relevance score based on the relevance of a web object (e.g., how closely the content of the web object corresponds to a search query), an authority score based on the reliability of the web object (e.g., how often the web object is selected, how many other web pages link to the web object, the placement of the web object within an overall structure of a website), or any other onsite data 122 and/or offsite data 124 indicating whether and where a web object should be ranked relative to other web objects in the search results.

In some instances, the global ranking score may be based on both offsite data 124 and onsite data 122, but the ranking module 114 may give more weight to offsite data 124 when calculating the global ranking score. Similarly, the onsite ranking score may be based on both onsite data 122 and offsite data 124 but with more weight given to the onsite data 122. The onsite ranking score may also be used separately to rank web pages within the same website, and the global ranking score may be used separately to rank websites relative to other websites.

In certain implementations, the ranking module 114 calculates the global ranking scores with respect to a specific query received from a user. For example, the search engine system 130 may receive a query for "laptop computers." The search module 112 at server 160*a* receives the query and identifies a plurality of web objects as search results. The web objects may include websites or specific web pages within a website. The ranking module 114 may determine a global ranking of the web objects, where each web object is compared to other web objects. In some implementations, the global ranking may be determined based on relevance scores, authority scores, or other indicators of the responsiveness of the search results to the query. The global ranking scores may give a higher weight to the available offsite data 124 associated with each web object in the set of search results. In the present example, web objects that have previously had more hits in response to queries for "laptop computers" may be rated higher with respect to the authority score for the web object, for example. The global ranking score for a website may also be increased if the authority score of the website indicates a high level of reliability associated with the website. Accordingly, the ranking module 114 determines a global ranking of the web objects as a list of search results based on the relevance and authority associated with each of the web objects for a particular query.

After determining the global ranking of the search results, the ranking module 114 may determine an onsite ranking score for each website in the search results having more than one web page. The onsite ranking is a ranking of web pages or web resources within the same website based on a set of onsite ranking criteria. In certain implementations, the onsite ranking criteria may be used to determine the importance of each web page relative to other web pages of the website. The onsite ranking criteria may also be used to determine the importance of a particular resource within the website based on other factors, such as the type of the search query or the type of the website, or for purposes other than or in addition to identifying search results based on relevance. For example, for a search query concerning a particular brand of product, the ranking module 114 may compute an onsite ranking for a web page by factoring in various criteria. A web page with information related to the cheapest product of the same brand found on the website, for example, may receive a high onsite ranking. In another example, the type of website may affect the criteria used to calculate the onsite ranking A forum website, for example, may assign higher onsite rankings to web pages containing newer forum posts. In certain implementations, the criteria for determining the onsite ranking scores may be different than the criteria for determining the global ranking scores.

In some implementations, the ranking module 114 may, for each website in the search results, calculate an onsite ranking score in which more weight is given to onsite data 122 associated with the website than to offsite data 124. Web pages that contain numerous instances of the word "laptop," for example, may be rated highly with respect to the onsite ranking score. The onsite ranking score may also reflect the importance of a particular web page within a website. The placement of the particular web page in the overall structure of the website may indicate a relative importance of the web page compared to other web pages of the same website. Accordingly, the ranking module 114 may use the onsite ranking scores to rank the web pages of a website in an onsite ranking.

In some cases, the search module 112 may use the global ranking of the search results and the onsite rankings of websites in the search results to generate a web page with ranked search results for presentation to a user. For example, in some implementations, the search module 112 may generate a list of search results that includes web pages responsive to a query. In some instances, each website is represented once in the list of search results by a particular web page associated with the website. Although multiple web pages on a website may be relevant to the search query, a particular web page may be selected to represent the website in the search results. In certain implementations, the web page selected to represent a website is the highest ranked web page in the local rankings for the website. Accordingly, the list of search results may include a listing of different websites ranked based on the global ranking for the search results while the web page representing each website is based, at least in part, on the onsite ranking for web pages of the website. In some instances, the search results may include a limited number of web pages associated with the same website. For example, multiple web pages from the same website can be nested or grouped together as primary and secondary results.

The global ranking of web objects may be used to form a list of search results responsive to the received search query.

The ranking module 114 may also further adjust the global ranking score or re-rank the search results based on the onsite ranking scores for individual websites. In certain implementations, the ranking module 114 may increase the global ranking score for one of the websites in the search results if a particular web page on the website is associated with exceptionally strong onsite ranking scores for that particular web page. For example, the ranking module 114 may determine that a particular web page within a website is most responsive to a query based on the web page's high onsite ranking scores. The ranking module 114 may also determine a high global ranking score for the same web page. Accordingly, if the global ranking score for the website associated with the web page is relatively low compared to other websites in the search results, the ranking module 114 may increase the global ranking score for the website given that a particular web page on the website is associated with a strong onsite ranking score or onsite ranking. Similarly, if the global relevance score for a website is very high but the web pages on the website all have low onsite ranking scores, the global ranking score for the website may be decreased in view of the fact that the web pages on the website are not strongly responsive to a search query according to the onsite ranking score.

In some instances, however, the degree of modification of the global ranking score for a particular website may be limited based on the internal structure of the website. For example, a web page that is placed in a low importance position within the structure of the website (e.g., based on being nested several layers down from the main web page for the website) may contain relevant information, but the placement of the web page may limit any increases in the global ranking score for the website. Further, the degree of modification of the global ranking score may also be limited by a threshold level of relative authority of the website compared to other websites. For example, the relative authority of a website may indicate low reliability as to the content or structure of the website. In this case, even if a web page on the website contains relevant information, the global ranking score for the website may not be increased due to the low reliability associated with the website.

The ranking module 114 may use the global and onsite ranking scores in different ways when ranking search results. In certain instances, the ranking module 114 may identify the most relevant web page that represents a website in the list of search results based on onsite or offsite data associated with the web page. In some cases, the ranking module 114 may generate new combined ranking scores for each website included in a set of search results by combining the global and onsite ranking scores for the most relevant web page of each website. The ranking module 114 may generate a combined ranking for each web page based on a combination of the global ranking of the web object that includes the web page and the onsite ranking of the web page. Generating the combined ranking for each web page may include limiting a degree of modification of the global ranking based on an internal structure of the corresponding website or a threshold level of relative authority of the website compared to other websites in a set of search results. Further, the ranking module 114 may dynamically increase or decrease the weight of the onsite ranking score relative to the weight of the global ranking score when combining them into the combined ranking score for a website based on the amount of historical data available to the ranking module 114, the strength of the onsite or offsite data associated with the search results, or various other factors. In some implementations, after global ranking scores are determined for search results, the onsite ranking scores may be determined for a purpose other than, or in addition to, determining relevant web pages. For example, onsite ranking scores may be determined based, at least in part, on the age of the search result, such as the chronological order in which the web page, web object, or web resource was created, or the presence of binary features in the search result, such as whether a web page has including images, videos, forms, or other types of content. The global ranking for search results may then be adjusted, in some instances, based on the onsite ranking scores for the search results.

Figure 2:
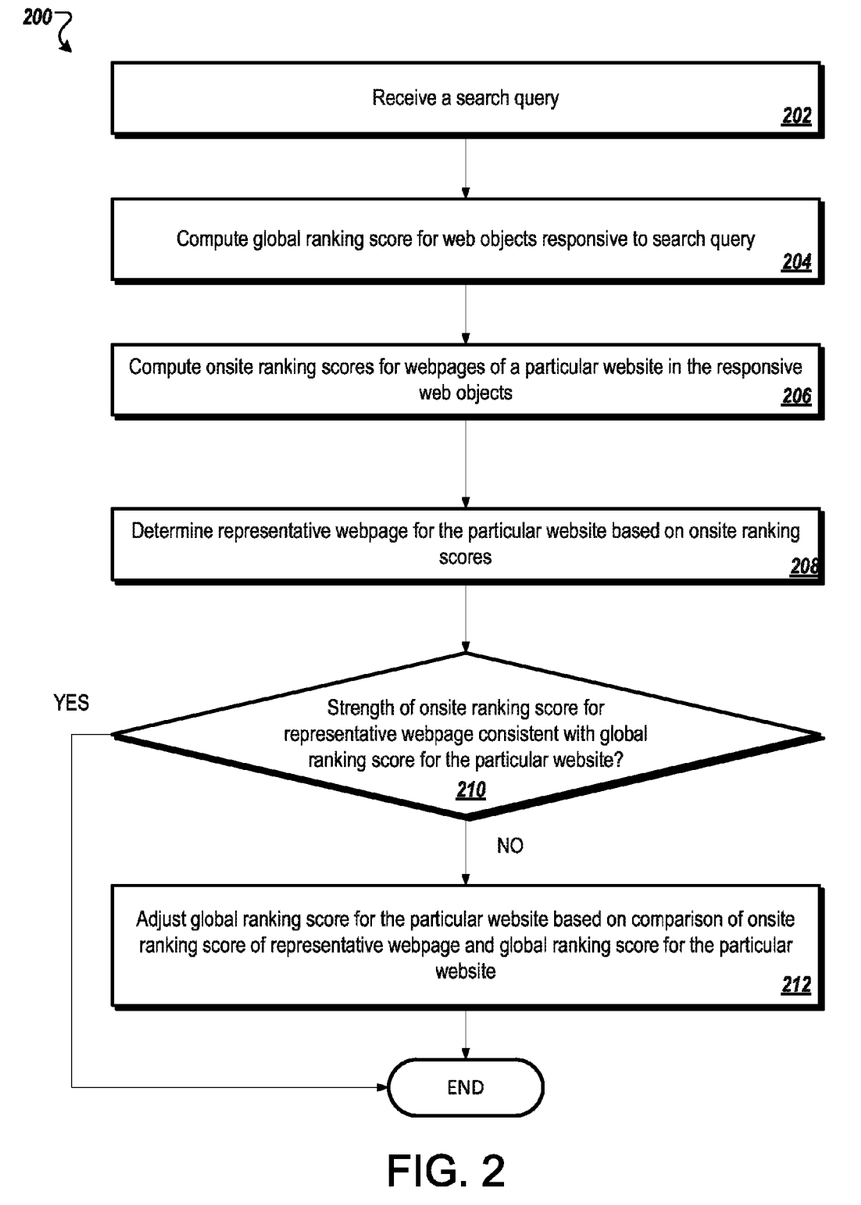
FIG. 2 is an example process for ranking web objects in search results.

FIG. 2 is a flow chart of an example process 200 for ranking web objects in search results. The search module 112 receives a search query at 202. The ranking module 114 computes a global ranking score for web objects responsive to the search query at 204. In some instances, the global ranking score is based on offsite data 124 associated with the web object. For example, the offsite data for a website may include historical data reflecting the number of hits on the website in response to particular search queries. The ranking module 114 computes onsite ranking scores for web pages of a particular website in the responsive web objects at 206. In certain instances, the ranking module 114 may compute onsite ranking scores for all of the web pages of the particular website while in other instances, the ranking module 114 may compute onsite ranking scores for a subset of the web pages of the particular website (e.g., only those web pages with a global ranking higher than a certain threshold). Further, the ranking module 114 may compute the onsite ranking scores based on onsite data 122 associated with the website. For example, the ranking module 114 may assign higher onsite ranking scores to web pages that include more instances of keywords found in the search query. In some implementations, the ranking module 114 analyzes the structure of the website and assigns onsite ranking scores based on the placement of a web page in relation to the structure of the website. The ranking module 114 may rate web pages in closer proximity to the homepage of the website with a higher onsite ranking score, for example, while assigning a lower rating for web pages that require more navigation through hyperlinks from the homepage.

The ranking module 114 determines a representative web page for the particular website based on the onsite ranking scores at 208. In certain implementations, the ranking module 114 selects the web page with the highest onsite ranking score as the representative web page for the particular website. The selected web page may represent the web page that is most relevant to the received search query compared with the other web pages on the website based on onsite signals associated with the website.

In some implementations, the ranking module 114 performs a determination for whether the strength of the onsite ranking score for the representative web page is consistent with the global ranking score for the particular website at 210. For example, the global ranking score for the particular website may indicate high relevance to the received search query. The onsite ranking score of the representative web page, however, may be very low with respect to the received search query. In this instance, the low onsite ranking score of the representative web page for the particular website may indicate that, despite the positive offsite signals for the website from external sources, there may actually be a lack of relevant web pages within the website. Accordingly, the global ranking score for the particular website may be inconsistent with the onsite ranking score of the website's representative web page if there is not a minimum level of agreement between the scores in terms of relevancy to a search query.

If the strength of the onsite ranking score for the representative web page is consistent with the global ranking score for the particular website, the ranking module 114 may not adjust the global ranking score for the website. If, however, the strength of the onsite ranking score for the representative web page is inconsistent with the global ranking score for the particular website, the ranking module 114 adjusts the global ranking score for the particular website based on comparison of the computed onsite ranking score of the representative web page and the global ranking score for the particular website at 210. In some implementations, the ranking module 114 adjusts the global ranking score based on a level of agreement between the global ranking score for the particular website and the onsite ranking score of the representative web page. In situations where the global ranking score for the particular website may indicate high relevance to the received search query but the onsite ranking score of the representative web page indicates very low relevancy to the received search query, for example, the global ranking score for the website may be lowered in view of the conflict between the offsite data associated with the global ranking score and the additional information obtained from onsite data. Alternatively, if the global ranking score for a website and the onsite ranking score for the representative web page of the website are in close agreement, the ranking module 114 may not adjust the global ranking score for the website. Further, in some implementations, the ranking module 114 may determine whether to adjust the global ranking score of a particular website based on the level of agreement of onsite ranking scores with global ranking scores associated with other websites in the search results.

Figure 3:
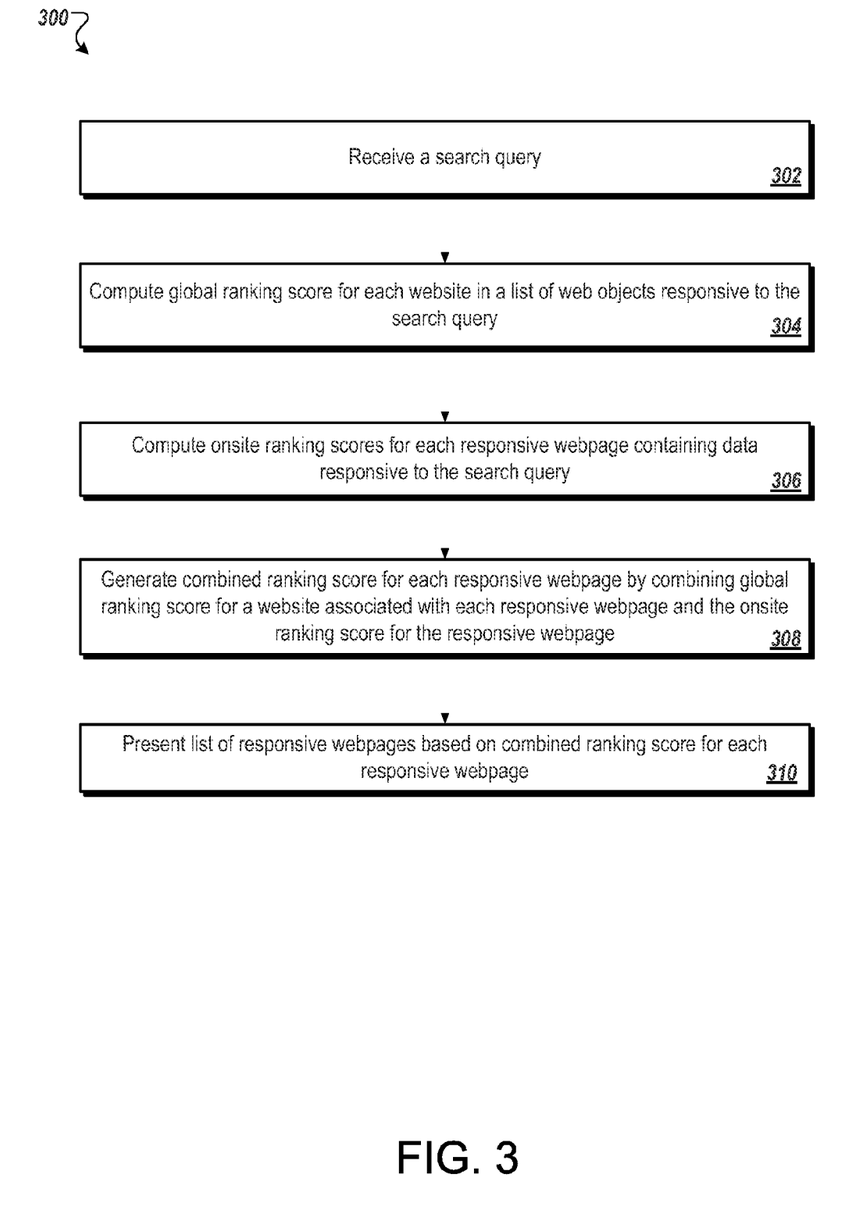
FIG. 3 is an example process for ranking web objects in search results.

The ranking module 114 may utilize the onsite data and offsite data associated with search results in different ways when ranking search results. In some implementations, the ranking module 114 may generate combined ranking scores based on a combination of the global ranking scores associated with a particular website and the onsite ranking scores associated with web pages found on the particular website. FIG. 3 is a flow chart of another example process 300 for ranking web pages in search results. A search query is received at 302. The global ranking score for each website in a list of web objects responsive to the search query is computed at 304. Onsite ranking scores for each responsive web page containing data responsive to the search query are computed at 306. A combined ranking score for each responsive web page is generated by combining the global ranking score for a website associated with each responsive web page and the onsite ranking score for the responsive web page at 308. In some implementations, the combination of the global ranking scores and the onsite ranking scores into a combined ranking score may include assigning different weights to the global ranking score and the onsite ranking score such that more or less weight may be given to the global ranking score compared to the onsite ranking score, depending on the situation. For example, the weights assigned to the global or onsite ranking scores may be based on the amount of historical data available, the strength of the onsite or offsite data associated with the search results, or various other factors. After the global ranking score is generated for each responsive web page, the list of responsive web pages is presented based on the global ranking score for each responsive web page at 310.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program, also known as a program, software, software application, script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by at least one processor, the method comprising:
   receiving a search query;
   obtaining search results that identify a plurality of respective web pages as being responsive to the search query;
   computing a respective global ranking score for each of the plurality of web pages, wherein each global ranking score is based at least in part on a measure of relevance of each web page to the search query;
   computing an onsite ranking score for each of the responsive web pages, wherein each web page is a web page on a corresponding website that includes a plurality of other web pages, wherein the onsite ranking score is computed from onsite data that is controlled by a webmaster or a developer of the website, wherein the onsite ranking score represents an indication of importance of the web page as responsive to the search query relative to all other web pages within the corresponding website;
   modifying the global ranking score for each responsive web page based on the onsite ranking score for the web page;
   generating a combined ranking of the plurality of web pages based on the global ranking scores of the web pages including the modified global ranking score for each web page; and
   providing the combined ranking of the plurality of web pages in response to the search query.

2. The method of claim 1, wherein the combined ranking includes a ranking of web pages from a plurality of websites.

3. The method of claim 1, wherein the combined ranking includes a ranking of a plurality of websites.

4. The method of claim 1, wherein modifying the global ranking score for each responsive web page based on the onsite ranking score for the web page comprises limiting a degree of modification of the global ranking score of a first web page based on a measure of authority of the corresponding website relative to other websites.

5. The method of claim 1, wherein modifying the global ranking score for each responsive web page based on the onsite ranking score for the web page comprises limiting a degree of modification of the global ranking score of a first web page based on a placement of the first web page in an internal structure of the corresponding website.

6. The method of claim 1, wherein the onsite ranking score is further based on a relative placement of the web page within an internal structure of the corresponding website.

7. The method of claim 1, wherein the onsite data includes, for each web page, a count of how many links exist to the web page from other web pages within the corresponding website.

8. The method of claim 1, wherein the onsite ranking score for each web page of a website is based on relative term counts of terms of the search query occurring in each web page of the website.

9. The method of claim 1, wherein the onsite ranking score is based on a type of the search query, a type of the corresponding website, a relative age of the particular resource with respect to other resources associated with the corresponding website, or a type of content associated with the web page.

10. The method of claim 1, wherein the set of onsite ranking criteria used to rank the plurality of web pages is different than a set of criteria used to compute the global ranking scores for the plurality of web pages.

11. A computer program product, encoded on one or more non-transitory computer storage media, comprising instructions that when executed by one or more computers cause the one or more computers to perform operations comprising:
- receiving a search query;
- obtaining search results that identify a plurality of respective web pages as being responsive to the search query;
- computing a respective global ranking score for each of the plurality of web pages, wherein each global ranking score is based at least in part on a measure of relevance of each web page to the search query;
- computing an onsite ranking score for each of the responsive web pages, wherein each web page is a web page on a corresponding website that includes a plurality of other web pages, wherein the onsite ranking score is computed from onsite data that is controlled by a webmaster or a developer of the website, wherein the onsite ranking score represents an indication of importance of the web page as responsive to the search query relative to all other web pages within the corresponding website;
- modifying the global ranking score for each responsive web page based on the onsite ranking score for the web page;
- generating a combined ranking of the plurality of web pages based on the global ranking scores of the web pages including the modified global ranking score for each web page; and
- providing the combined ranking of the plurality of web pages in response to the search query.

12. The computer program product of claim 11, wherein modifying the global ranking score for each responsive web page based on the onsite ranking score for the web page comprises limiting a degree of modification of the global ranking score of a first web page based on a measure of authority of the corresponding website relative to other websites.

13. The computer program product of claim 11, wherein the onsite ranking score is further based on a relative placement of the particular webpage within an internal structure of the corresponding website.

14. The computer program product of claim 11, wherein the onsite data includes, for each web page, a count of how many links exist to the web page from other web pages within the corresponding website.

15. A system comprising:
- one or more computers and one or more storage devices storing instructions that are operable, when executed by the one or more computers, to cause the one or more computers to perform operations comprising:
  - receiving a search query;
  - obtaining search results that identify a plurality of respective web pages as being responsive to the search query;
  - computing a respective global ranking score for each of the plurality of web pages, wherein each global ranking score is based at least in part on a measure of relevance of each web page to the search query;
  - computing an onsite ranking score for each of the responsive web pages, wherein each web page is a web page on a corresponding website that includes a plurality of other web pages, wherein the onsite ranking score is computed from onsite data that is controlled by a webmaster or a developer of the website, wherein the onsite ranking score represents an indication of importance of the web page as responsive to the search query relative to all other web pages within the corresponding website;
  - modifying the global ranking score for each responsive web page based on the onsite ranking score for the web page;
  - generating a combined ranking of the plurality of web pages based on the global ranking scores of the web pages including the modified global ranking score for each web page; and
  - providing the combined ranking of the plurality of web pages in response to the search query.

16. The system of claim 15, wherein the combined ranking includes a ranking of web pages from a plurality of websites.

17. The system of claim 15, wherein the onsite ranking score is further based on a relative placement of the web page within an internal structure of the corresponding website.

18. The system of claim 15, wherein the onsite data includes, for each web page, a count of how many links exist to the web page from other web pages within the corresponding website.

* * * * *